United States Patent
Adam et al.

(10) Patent No.: US 10,452,067 B2
(45) Date of Patent: Oct. 22, 2019

(54) SYSTEM AND METHOD FOR DETECTING IMPROPER SENSOR INSTALLATION WITHIN A VEHICLE TO MITIGATE HAZARDS ASSOCIATED WITH OBJECT DETECTION

(71) Applicant: GM Global Technology Operations LLC, Detroit, MI (US)

(72) Inventors: Paul A. Adam, Milford, MI (US); Xiaofeng F. Song, Novi, MI (US); Dmitriy Feldman, West Bloomfield, MI (US); Kevin K. Hoang, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 198 days.

(21) Appl. No.: 15/440,348

(22) Filed: Feb. 23, 2017

(65) Prior Publication Data
US 2018/0239354 A1 Aug. 23, 2018

(51) Int. Cl.
| | |
|---|---|
| G01S 13/87 | (2006.01) |
| B60R 16/023 | (2006.01) |
| G01S 7/497 | (2006.01) |
| G05D 1/00 | (2006.01) |
| G01S 7/40 | (2006.01) |
| G01S 13/93 | (2006.01) |
| G07C 5/08 | (2006.01) |

(52) U.S. Cl.
CPC ....... *G05D 1/0077* (2013.01); *B60R 16/0232* (2013.01); *G01S 7/4021* (2013.01); *G01S 13/931* (2013.01); *G07C 5/0816* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,930,063 B2* | 1/2015 | Gandhi | ................... | B60R 16/02 180/128 |
| 9,221,396 B1* | 12/2015 | Zhu | ........................ | B60Q 9/008 |
| 2016/0291145 A1* | 10/2016 | Zeng | ..................... | G01S 13/723 |
| 2017/0261600 A1* | 9/2017 | Maennicke | ........... | G01S 13/931 |

* cited by examiner

*Primary Examiner* — Thomas G Black
*Assistant Examiner* — Ana D Thomas

(57) ABSTRACT

A system according to the principles of the present disclosure includes a current object position module, an expected position module, and an object position comparison module. The current object position module can determine a first position of an object with respect to a position of a vehicle based upon sensor data generated by a first object detection sensor within the vehicle and determines a second position of the object with respect to the position of the vehicle based upon sensor data generated by a second object detection sensor. The expected object position module can determine an expected position of the object with respect to the position of the vehicle based upon the first position of the object. The object position comparison module can determine whether at least one object detection sensor is improperly installed within the vehicle based upon comparing the second position of the object with the expected position.

15 Claims, 6 Drawing Sheets

| Sensor Location | Sensor | Relative Motion of Target (X) | Relative Motion of Target (Y) | Positional Deviation from Selected Sensor |
|---|---|---|---|---|
| 102(1) | 102(1) | - | 0 | 0 |
| | 102(2) | - | + | -67° |
| | 102(3) | - | + | 63.5° |
| | 102(4) | + | + | -130° |
| | 102(5) | + | - | 146.5° |

FIG. 3

| Sensor Location | Sensor | Relative Motion of Target (X) | Relative Motion of Target (Y) | Positional Deviation from Selected Sensor |
|---|---|---|---|---|
| 102(2) | 102(1) | - | - | -67° |
| | 102(2) | - | + | 0° |
| | 102(3) | - | + | 131° |
| | 102(4) | + | + | -63.5° |
| | 102(5) | + | - | ~146° |

FIG. 5

SYSTEM AND METHOD FOR DETECTING IMPROPER SENSOR INSTALLATION WITHIN A VEHICLE TO MITIGATE HAZARDS ASSOCIATED WITH OBJECT DETECTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle sensors, and more specifically to a system and a method for detecting improper installation of object detection sensors employed by vehicles.

Vehicles can employ sensors that are configured to detect information regarding an environment in which the vehicle operates. In some instances, vehicles can operate in an autonomous mode in which the vehicle navigates the environment with little to no input from a driver. In these instances, the vehicles utilize the detected information to make navigation decisions to traverse the environment.

SUMMARY

A system according to the principles of the present disclosure includes a current object position module, an expected position module, and an object position comparison module. The current object position module can determine a first position of an object with respect to a position of a vehicle based upon sensor data generated by at least a first object detection sensor disposed within the vehicle and determines a second position of the object with respect to the position of the vehicle based upon sensor data generated by a second object detection sensor. The expected object position module can determine an expected position of the object with respect to the position of the vehicle based upon at least the first position of the object. The object position comparison module can determine whether at least one object detection sensor is improperly installed within the vehicle based upon comparing at least the second position of the object with the expected position of the object.

A method according to the principles of the present disclosure includes determining a first position of an object with respect to a position of a vehicle based upon sensor data generated by a first object detection sensor disposed within the vehicle and determines a second position of the object with respect to the position of the vehicle based upon sensor data generated by a second object detection sensor. The method also includes determining an expected position of the object with respect to the position of the vehicle based upon at least the first position of the object. The method also includes determining whether at least one object detection sensor is improperly installed within the vehicle based upon comparing at least the second position of the object with the expected position of the object.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a diagrammatic illustration of an example sensor position table generated by an example sensor diagnostic module according to the principles of the present disclosure;

FIG. 5 is a diagrammatic illustration of an example sensor position table generated by a sensor installation detection module according to the principles of the present disclosure.

In the drawings, reference numbers may be reused to identify similar and/or identical elements.

DETAILED DESCRIPTION

Autonomous vehicles and active safety vehicle applications utilize multiple sensors disposed (i.e., mounted, etc.) at various locations and/or azimuth orientation angles within a vehicle to mitigate hazards or make navigational decisions to traverse an environment in which the vehicle is operating. In one example, the autonomous vehicles and/or active safety vehicle applications utilize fusion of objects detected by the sensors to determine whether a potential hazard is imminent. In some cases, the autonomous vehicles and/or active safety vehicle applications can detect possible impact with obstacles, such as other vehicles, walls, pedestrians, road hazards, and the like, to initiate safety measures (i.e., pre-tensioning of seat belts, initiating an alert, inflating an airbag, initiating vehicle breaking system, etc.).

However, sensors, such as object detection sensors, could be installed improperly that results in incorrect object position detection. Incorrect object position detection can result in errors in the object sensor processing fusion, which could cause missed detection, false detection, and/or false initiation of safety measures.

The present disclosure is directed to a system and a method to detect improper object detection sensor installation to mitigate hazards associated with operational safety. In one example, the system and the method determines a first position of an object with respect to a position of a vehicle based upon sensor data provided by an object detection sensor and determines a second position of the object with respect to the position of the vehicle based upon sensor data provided by another object detection sensor. The system and method also determines an expected position of the object with respect to the position of the vehicle based upon the first position and determines whether an object detection sensor has been improperly installed within the vehicle based upon a comparison of the second position of the object with the expected position of the object.

Figure 1:
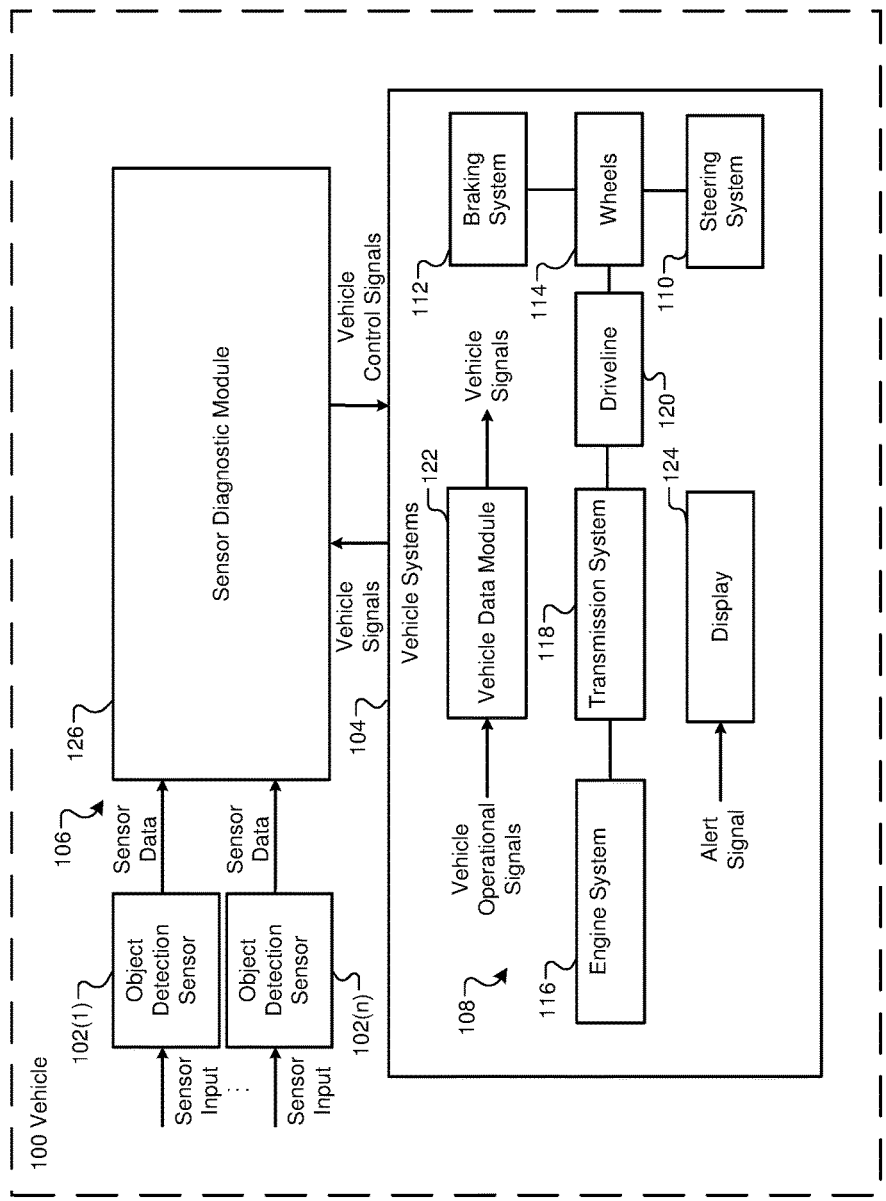
FIG. 1 is a functional block diagram of an example vehicle, vehicle systems, and improper sensor installation detection system according to the principles of the present disclosure.

Referring to FIG. 1, a functional block diagram illustrates an example implementation of a vehicle 100 according to the present disclosure. Generally, the vehicle 100 employs multiple object detection sensors 102 (i.e., object detection sensors 102(1) through 102(n) where n represents an integer greater than zero) about the vehicle 100. The object detection sensors 102 generate respective sensor data indicative of an object that can be detected within a field-of-view of the respective object detection sensor 102 based upon respective sensor inputs.

The sensor inputs represent signals detected by the respective object detection sensors 102 utilized to determine whether an object is within a field-of-vision of the respective object detection sensor 102. In one example, the object detection sensors 102 may be radars, such as short-range radars, medium-range radars, and/or long-range radars, that continually detect objects about a vehicle 100. In another example, the object detection sensors 102 may be image capture devices that capture images and/or videos within a field-of-view of the respective image capture devices. In another example, the object detection sensors 102 may be light detection and ranging (LIDAR) devices. In yet another example, the object detection sensors 102 may be ultrasound devices.

As shown in FIG. 1, the vehicle also includes vehicle systems 104 and an improper sensor installation detection system 106. The vehicle systems 104 include a powertrain system 108, a steering system 110, and a braking system 112. The powertrain system 108 is a system of components that drive one or more wheels 114 of the vehicle 100, referred to herein as driven wheels. The powertrain system 108 includes an engine system 116, a transmission system 118, and a driveline 120. The present disclosure is not limited to conventional powertrains or hybrid powertrains, and may implement a drive-by-wire system. The present disclosure is also not limited to powertrains of a particular layout or drivelines of a particular type. For example, the powertrain system 108 may have a front-wheel-drive layout, a rear-wheel-drive layout, or an all-wheel drive layout. The present disclosure is also not limited to transmission systems of a particular type. For example, the transmission system 118 may include an automatic transmission, a manual transmission, or a continuously variable drive ratio transmission (CVT).

The engine system 116 includes a system of engine components and engine actuators operably coupled to the engine components. The engine components produce drive torque that is output to the transmission system 118. In a non-limiting example, the engine system 116 may be a start-stop type hybrid engine system including an internal combustion engine (ICE) and an electric motor.

The transmission system 118 includes a system of transmission components and transmission actuators operably coupled to the transmission components 80. The transmission components receive the drive torque output by the engine system 116 and transmit the drive torque to the driveline 120 at one of multiple gear ratios. In a non-limiting example, the transmission system 118 may be an automatic transmission system.

The driveline 120 receives the drive torque output by the transmission system 118 and transmits the drive torque to the driven wheels 114. Together, the engine system 116, the transmission system 118, and the driveline 120 are operable to vary one or more powertrain operating characteristics such as engine responsiveness and feel, transmission responsiveness and feel, and vehicle fuel economy.

The steering system 110 includes a system of steering components that allow the vehicle 100 to follow a desired course and steering actuators operably coupled to the steering components. The present disclosure is not limited to steering systems of a particular type. For example, the steering system 110 may be of the rack and pinion, recirculating ball, or worm and sector type. Additionally, the steering system 110 may be a semi-active or active system and, in various aspects, may implement a steer-by-wire system. The steering components connect a steering wheel to one or more of the wheels 114 (typically one or more pairs of wheels), generally referred to herein as steered wheels. In various aspects, the steering components may include, for example, various linkages, rods, pivots, and/or gears.

The braking system 112 is a system of braking components that are utilized to inhibit the motion of the vehicle 100 and are connected to the wheels 114. In one example, the braking system 112 includes braking actuators operably coupled to the braking components. The present disclosure is not limited to braking systems of a particular type. For instance, the braking system 112 may be a frictional braking system or an electromagnetic braking system.

The vehicle 100 also includes a vehicle data module 122 that can provide vehicle signals representing vehicle data, such as a position of the vehicle 100, a speed of the vehicle 100, and/or a trajectory of the vehicle 100 utilizing one or more operational vehicle signals obtained from the vehicle 100 and/or the vehicle data module 122. In one example, the vehicle data module 122 may include a global position system (GPS) that determines a location of the vehicle and provides vehicle signals representing positional information of the vehicle 100. In another example, the vehicle data module 122 may obtain vehicle operational signals representing speed of the vehicle from wheel sensors associated with the respective wheels 114 of the vehicle 100. Thus, the vehicle data derived from the vehicle signals may comprise, but is not limited to: a current speed of the vehicle, a current position of the vehicle, a current trajectory of the vehicle (i.e., calculated based upon the current speed and the current position of the vehicle), and the like.

The vehicle 100 can include a display 124 that can display images, video, overlays, data, and the like, based upon signals received from the improper sensor installation detection system 106. In various implementations, the display 124 can furnish information to an operator indicating that at least one object detection sensor 102 has been improperly installed within the vehicle 100.

Figure 2:
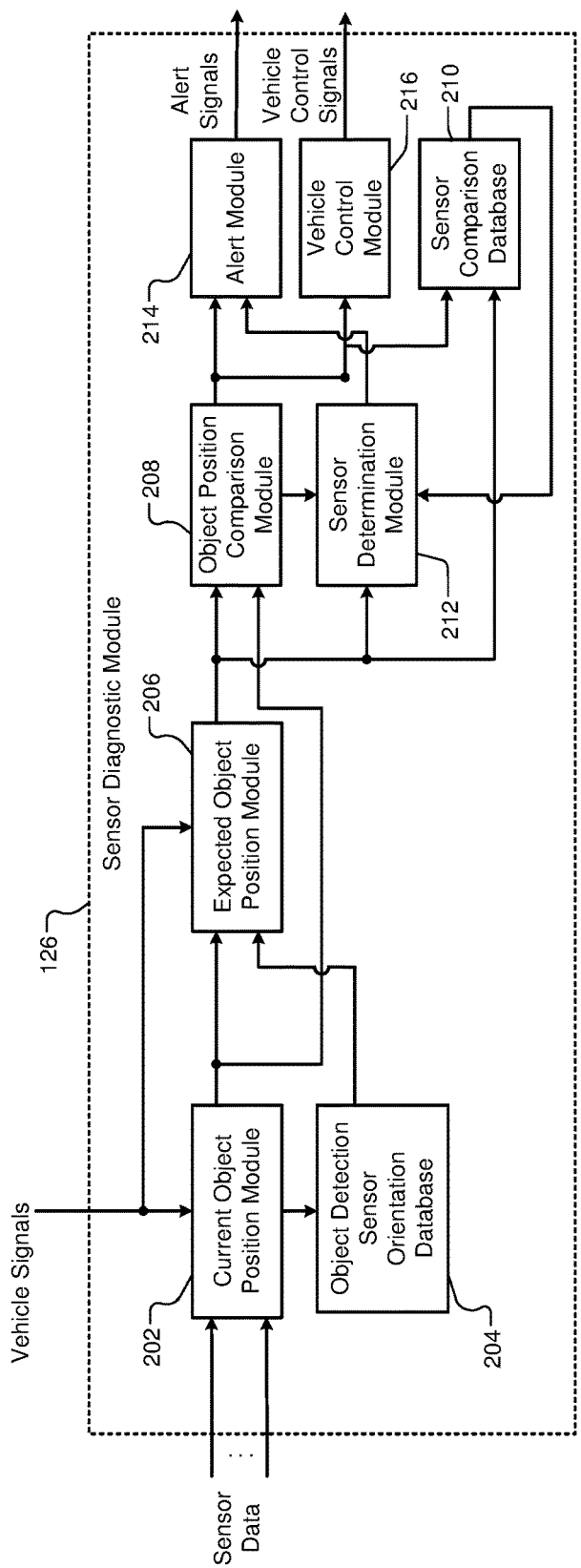
FIG. 2 is a functional block diagram of an example sensor diagnostic module according to the principles of the present disclosure.

The improper sensor installation detection system 106 includes sensor diagnostic module 126. As shown in FIG. 2, an exemplary implementation of the sensor diagnostic module 126 that that determines whether an object detection sensor 102 has been improperly installed within the vehicle 100. The sensor diagnostic module 126 can determine whether an object detection sensor 102 is improperly installed within a vehicle 100. Additionally, the sensor diagnostic module 126 can generate alerts indicating that the vehicle 100 includes an improperly installed object detection sensor 102 and can generate vehicle control signals to modify one or more operational states of the vehicle 100.

The sensor diagnostic module 126 includes a current object position module 202 and an object sensor orientation database 204. The current object position module 202 determines a position of the detected object with respect to a position of the vehicle 100 based upon the sensor data received from a respective object detection sensor 102 and the vehicle data. The current object position module 202 utilizes the inputs to determine (i.e., detect) a first position of the object with respect to a position of the vehicle 100 based upon, in part, the sensor data from a first object detection sensor 102 (i.e., object detection sensor 102(1)). In one example, the current object position module 202 determines relative positional parameters (i.e., X- and Y-coordinates) of a detected object with respect to the vehicle 100.

An object detection sensor 102(1) generates and transmits a signal (i.e., a laser signal, a radio wave signal, etc.) and measures the time it takes for the signal to travel to and from the object. For instance, the object detection sensor 102(1) transmits a signal that is reflected from an object proximate to the vehicle 100 and the object detection sensors 102 generate sensor data representative of the time measurement for the signal to travel to and from the object proximate to the vehicle as well relative positional data of the object with respect to the detecting object detection sensor 102.

The current object position module 202 can apply sensor fusion processing techniques to the sensor data obtained from the object detection sensors 102 and the vehicle data to perceive an environment around the vehicle 100. In one example, the current object position module 202 can utilize sensor fusion processing techniques to determine one or more positions (i.e., motion) of an object with respect to the vehicle based upon sensor data received from the respective object detection sensors 102 (i.e., object detection sensors 102(1) through 102(N)) and the vehicle data. Thus, the current object position module 202 can determine changes in the positional parameters relative to the vehicle 100 based upon the motion of the vehicle 100 with respect to the detected object.

The current object position module 202 can determine a first position of an object with respect to the vehicle 100 based upon the sensor data received from a first object detection sensor 102(1) and the vehicle data. For instance, the current object position module 202 calculates a position of an object based upon the sensor data and the positional data representing the current position and/or the speed of the vehicle 100 as provided by the vehicle data. In one example, the current object position module 202 can continually monitor the detected object based upon the received sensor data and determine changes in the positional parameters of detected object with respect to the vehicle 100 based upon the vehicle data (i.e., trajectory of the vehicle 100, etc.). In implementations, the sensor fusion techniques can include, for instance, a Kalman filter, a Bayesian network, and the like.

The current object position module 202 can also determine another position of the object (i.e., a second position, a third position, etc.) with respect to the vehicle 100 based upon, in part, sensor data received from the object detection sensor 102 (i.e., object detection sensor 102(3)) and the vehicle data. In one example, the current object position module 202 continually determines multiple positional parameters (i.e., changes in X- and Y-coordinates) of a detected object with respect to the vehicle 100 utilizing the sensor data and the vehicle data representing the current positions of the vehicle and/or speed of the vehicle 100. For instance, the current object position module 202 can detect an object based upon sensor data received from a first object detection sensor 102(1) and continue detecting the object as the object and/or the vehicle 100 transitions past one another by way of the sensor data received from a second object detection sensor 102(2) to determine changes in X- and Y-coordinates of the detected object with respect to the vehicle 100.

The object detection sensor orientation database 204 maintains expected orientation parameters representing an expected relative positional and/or angle information pertaining to a particular object detection sensor 102 (i.e., object detection sensor 102(1)) with respect to the other object detection sensors 102 (i.e., object detection sensors 102(2) through 102(5)). In one example, the object detection sensor orientation database 204 maintains the expected relative orientation parameters of the object detection sensors 102 with respect to an object detection sensor 102 that is providing sensor data indicative of the detected object. In one example, the object detection sensor orientation database 204 maintains the expected angular deviation of the other object detection sensors 102 (i.e., object detection sensors 102(2) through 102(5)) with respect to the particular object detection sensor 102 (i.e., object detection sensor 102(1)).

The object detection sensor orientation database 204 receives input from the current object position module 202 indicating which object detection sensor(s) 102 is/are detecting objects within a field-of-view of the respective object detection sensor(s) 102. The object detection sensor orientation database 204 provides the expected orientation parameters for the respective object detection sensor(s) 102 detecting objects to an expected object position module 206.

The expected object position module 206 determines (i.e., calculates) expected position(s) of the object based upon the input data provided by the current object position module 202 and the object detection sensor orientation database 204. In one example, the expected object position module 206 calculates expected changes (i.e., deviations) in X- and Y-coordinates of the detected object based upon the trajectory of the vehicle 100. The expected object position module 206 can generate an expected object position table indicating expected positional coordinate deviations of the tacked object with respect to the vehicle 100 based upon the motion of the vehicle 100. The expected object position module 206 receives the current object positions of the object and generates an expected object position table that represents the expected object behavior.

Referring to FIG. 3, an expected sensor position table 300 can indicate expected relative motion of an object based upon sensed data detected by an object detection sensor 102 and with respect to the position and/or trajectory of the vehicle 100 as provided by the vehicle data. As described below, the expected sensor position table 300 can provide example detected relative motion of an object if a specific sensor was installed within a specific location. The expected object position module 206 can utilize the expected sensor position table 300 to generate the expected object position tables.

In one example, column 302 of the expected sensor position table 300 represents the current sensor location (i.e., object detection sensor 102(1)) that detected the first position of the object with respect to the vehicle, column 304 represents the other respective object detection sensors 102 (i.e., object detection sensors 102(2) through 102(5)), column 306 represents the relative expected motion (i.e., trajectory) of the detected object with respect to an X-axis (see FIG. 4) as defined by the vehicle 100, column 308 represents the relative expected motion (i.e., trajectory) of the detected object with respect to an Y-axis (see FIG. 4) as defined by the vehicle 100, and column 310 represents the positional deviation (i.e., orientation parameters) of the respective object detection sensor 102 with respect to the selected object detection sensor 102.

The respective rows 312 through 320 represent example relative motion of the object if the specific sensor was installed in that specific location. For instance, the arrow in column 304 indicates an orientation of the respective sensor 102 when that sensor 102 is installed in the sensor location defined in column 302. The respective lines indicate the relative coordinate system of the respective sensor 102 if that sensor 102 had been installed in sensor location defined in column 302. In one example, as shown in FIG. 3, the sensor location pertaining to object detection sensor 102(1) illustrates that an object detection sensor 102 is oriented as point toward the front left area of the vehicle 100 as indicated by the blue arrow. If an incorrect sensor 102 (i.e., object detection sensor 102(2)) was improperly installed in the sensor location pertaining to 102(1), an object moving in the +X direction with respect to the vehicle 100 coordinates would be detected by this object detection sensor 102 as moving diagonally with respect to the vehicle 100.

Additionally, the example expected sensor position table 300 includes the relative orientation parameters (i.e., angular positions, etc.) of object detection sensors 102(2) through 102(5) with respect to the object detection sensor 102(1). As illustrated, the relative angular position of the other object detection sensors 102(2) through 102(5) is rotated to a specific angle with respect to the object detection sensor 102(1). In one example, the relative angle of the object detection sensor 102(2) is rotated −67 degrees with respect to the object detection sensor 102(1); the relative angle of the object detection sensor 102(3) is rotated 63.5 degrees with respect to the object detection sensor 102(1); the relative angle of the object detection sensor 102(4) is rotated −130 degrees with respect to the object detection sensor 102(1); and the relative angle of the object detection sensor 102(5) is rotated 146.5 degrees with respect to the object detection sensor 102(1).

Figure 4:
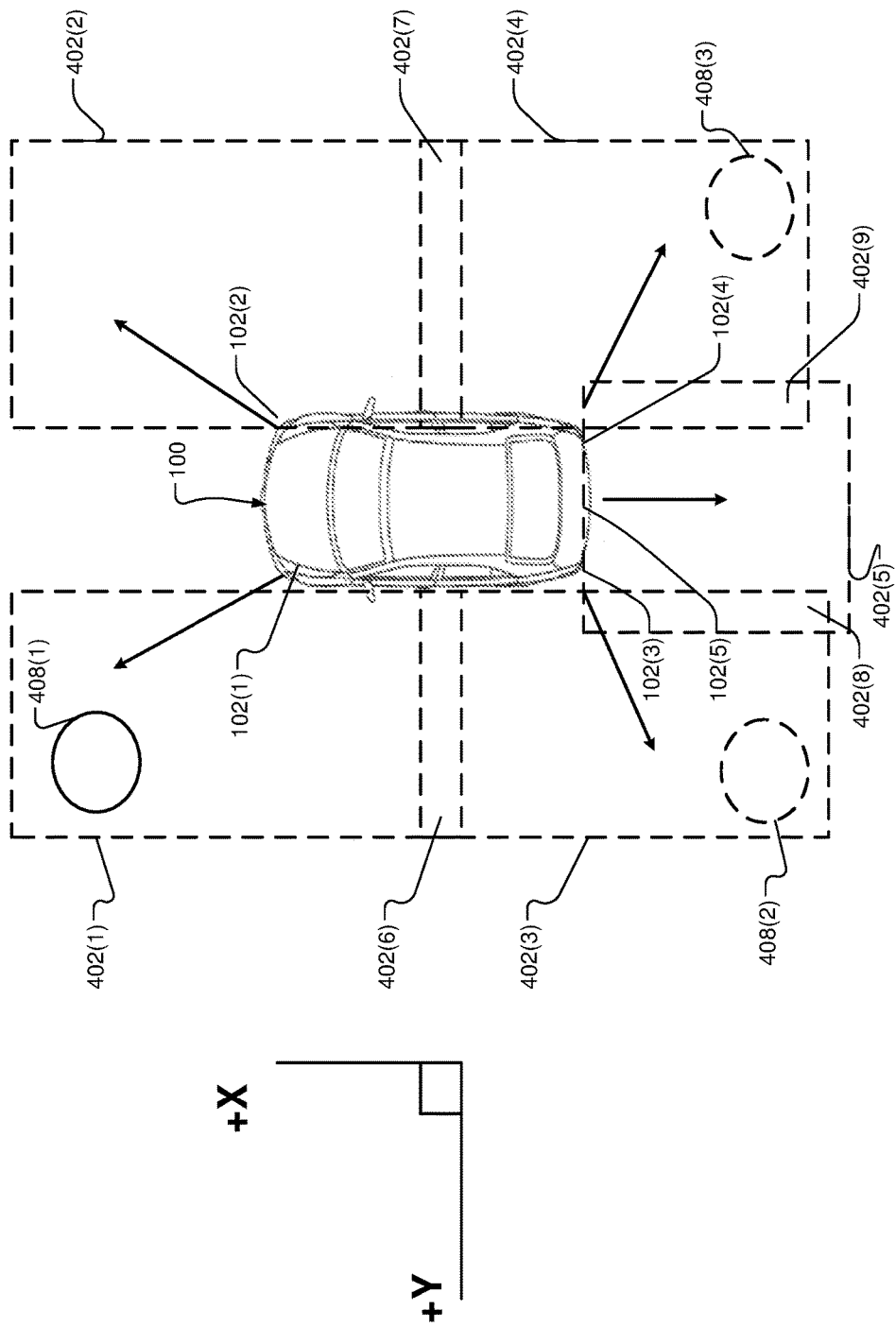
FIG. 4 is a diagrammatic illustration of an example vehicle including multiple object detection sensors and the respective detection regions of the object detection sensors according to the principles of the present disclosure.

Referring to FIG. 4, relative motion of the detected object with respect to the vehicle 100 can be defined based upon an X- and Y-coordinate system having an X-axis and a Y-axis. The X-axis is defined as the axis that is parallel to an axis defined by the length of the vehicle 100, and the Y-axis is defined as the axis that is parallel to an axis defined by the width of the vehicle 100. Positive X-coordinates of a detected object are defined with respect to the front of the vehicle 100, and negative X-coordinates of the detected object are defined with respect to the rear of the vehicle 100. Positive Y-coordinates of a detected object are defined with respect to the left of the vehicle 100, and negative Y-coordinates of the detected object are defined with respect to the right of the vehicle 100. The point of origin for the coordinate system is defined as the center of the vehicle 100.

As described above, the current object position module 202 can determine a position of the detected object in terms of relative changes X- and Y-coordinates with respect to the vehicle 100 and based upon the previously detected X- and Y-coordinates for the object. In one example, A first position is a first X-coordinate and a first Y-coordinate indicative of a relative position of the object with respect to the vehicle 100 as detected by the first object detection sensor 102. Subsequent positions (i.e., second position, third position, etc.) is a subsequent X-coordinate and a subsequent Y-coordinate indicative of a relative position of the object with respect to the vehicle as detected by a second object detection sensor 102.

For instance, the object detection sensor 102(1) tracks an object initially detected to the left and to the front of the vehicle 100 while the vehicle is moving in a forward direction. The current object position module 202 determines positions of the object based upon the returned sensor data representing relative X- and Y-coordinates that account for the motion of the vehicle 100. The current object position module 202 would determine positions of the object indicative of X-coordinates changing from positive to negative and the Y-coordinates staying relatively constant.

Each object detection sensor 102 has a corresponding field-of-view that is referred to as a detection region 402 (i.e., detection regions 402(1) through 402(5)). The object detection sensors 102 can track the relative motion of the object with respect to the vehicle 100 while the object is detected within a detection region 402 of the object detection sensor 102. In some instances, multiple object detection sensors 102 can detect and track the same object when that object is within a field-of-view of the respective object detection sensors 102. In these instances, the detection regions 402 of the object detection sensors 102 overlap as shown by detection regions 402(6), 402(7), 402(8), and 402(9).

The expected object position module 206 can generate an expected object position table utilizing the sensed data within the overlapping detection regions 402(6), 402(7), 402(8), and 402(9) that is indicative of the expected changes in positional parameters of the detected object as the vehicle 100 (or object) transitions about one another. Thus, the expected object position table provides predicted changes in X- and Y-coordinates of the detected object with respect to the vehicle 100. In one example, the expected object position table defines an expected position, which may be defined as a first expected relative change (i.e., difference) between the subsequent X-coordinate and the first X-coordinate and a second expected relative change (i.e., difference) between the subsequent Y-coordinate and the first Y-coordinate. For instance, the expected object position table provides what changes in positional parameters of the detected object should be detected by the next object detection sensor 102.

In one example, the object detection sensor 102(1) detects an object 408(1). In this example, the object detection sensor 102(3) and the object detection sensor 102(4) have been improperly swapped. The object 408(1) is continually detected by the object detection sensor 102(1) through detection region 402(1). Once the object 408(1) is detected detection region 402(6), object detection sensors 102(1) and 102(3) detect the detected the object. Utilizing the input data provided by the current object position module 202 and the vehicle data, the expected object position module 206 generates an expected object position table predicting expected sensed data from the object detection sensor 102(3).

In this example, the expected object position module 206 predicts that the detected object is to be detected within detection region 402(3) based upon the expected changes in positional parameters (i.e., relative changes in X- and Y-coordinates), which is represented as object 408(2). However, due to the improper swapping, the current object position module 202 determines, based upon the detected changes in positional parameters, that the detected object (i.e., object 408(3)) is detected in detection region 402(4).

Referring to FIG. 2, the object position comparison module 208 receives input data generated at the current object position module 202 and the expected object position module 206. The object position comparison module 208 compares a current position (i.e., positional parameters) of an object as determined by the current object position module 202 with the expected position (i.e., expected positional parameters) of the object as determined by the expected object position module 206. Based upon the comparison, the object position comparison module 208 determines whether at least one object detection sensor 102 is improperly installed.

In one example, the object position comparison module 208 determines that an object detection sensor 102 is improperly installed within the vehicle 100 when the first expected relative change does not correspond to a first actual change defined as a difference between the subsequent X-coordinate and the first X-coordinate or the second expected relative change does not correspond to a second actual change defined as a difference between the second Y-coordinate and the first Y-coordinate.

For instance, the object position comparison module 208 can receive data representing the determined positions of the object with respect to the vehicle 100 from the current object position module 202 and data representing the expected position(s) of the object with respect to the position of the vehicle 100 from the expected object position module 206. As an object transitions from a detection region (i.e., detection region 402(1)) of a first object detection sensor 102 (i.e., object detection sensor 102(1)) to a detection region (i.e., detection region 402(3)) of a second object detection sensor 102 (i.e., object detection sensor 102(3)), the object position comparison module 208 compares the detected positional parameters of the object as detected by the second object detection sensor 102 with the expected positional parameters of the object.

As discussed above, the expected position of the object can be determined based upon the detected position of the object as detected within an overlapping detection region 402 (i.e., detection regions 402(6), 402(9), 402(8), and/or 402(9)). The object position comparison module 208 compares (i.e., cross-references) the detected positional parameters of the object as detected by the second object detection sensor 102 with the expected positional parameters determined by the expected object position module 206.

The object position comparison module 208 can determine that an object detection sensor 102 is improperly installed within the vehicle 100 when the expected positional parameters of the object does not correspond (i.e., deviates, does not match, etc.) to a detected positional parameters of the object as detected by a second object detection sensor 102. In one example, the object position comparison module 208 compares the detected X- and Y-coordinates of the detected object as detected by the second object detection sensor 102 with the expected X- and Y-coordinates of the object corresponding to the second object detection sensor 102. In this example, the object position comparison module determines that an object detection sensor 102 is improperly installed within the vehicle 100 when the expected X- and Y-coordinates (i.e., a negative X-coordinate with respect to the previous X-coordinate and a relatively constant Y-coordinate with respect to the previous Y-coordinate based upon the trajectory of the vehicle 100) of the object does not correspond with the detected position of the object (i.e., a positive X-coordinate with respect to the previously detected X-coordinate and a positive Y-coordinate with respect to the previously detected Y-coordinate).

FIG. 5 illustrates another example expected sensor position table 500 of the detected positions of the object indicative of an improper swapping based upon detected changes in X- and Y-coordinates that do not correspond to the expected positional parameters of the object with respect to the vehicle 100. Similar to the expected sensor position table 300 shown in FIG. 3, column 502 represents the current sensor location (i.e., object detection sensor 102(2)) that detects the first position of the object with respect to the vehicle, column 504 represents the other respective object detection sensors 102 (i.e., object detection sensors 102(1) and 102(3) through 102(5)), column 506 represents the relative detected motion (i.e., trajectory) of the detected object with respect to an X-axis as defined by the vehicle 100, column 508 represents the relative detected motion (i.e., trajectory) of the detected object with respect to an Y-axis as defined by the vehicle, and column 510 represents the positional deviation from selected object detection sensor 102. The respective rows 512 through 520 represent relative motion of the object if the specific sensor 102 was installed in the location identified in column 502.

The sensor diagnostic module 126 may also include a sensor comparison database 210 and a sensor determination module 212. The sensor comparison database 210 maintains previous comparison data generated by the object position comparison module 208 and previous generated expected positional parameters generated by the expected object position module 206. The sensor determination module 212 utilizes comparison data provided by the sensor comparison database 210 for a particular object detection sensor 102 to determine whether previous comparison data is consistent with the expected position data generated by the expected object position module 206 to determine which object detection sensor 102 is improperly installed.

For instance, the sensor determination module 212 utilizes the current comparison data generated by the object position comparison module 208, the previously generated comparison data stored in the sensor comparison database 210, and the expected positional parameters generated by the expected object position module 206 to determine which object detection sensor 102 is improperly installed. In one example, the sensor determination module 212 compares current comparison data for an object detection sensor 102 (i.e., object detection sensor 102(3)) with previously generated comparison data pertaining to the same object detection sensor 102 (i.e., object detection sensor 102(3)) to determine whether the object detection sensor 102 is consistently detecting a target that relatively transitions to the front and to the right of the vehicle 100 upon detection by the object detection sensor 102(3). In this example, the sensor determination module 212 can determine that the object detection sensor 102(3) is improperly installed based upon the consistent determination of relative positional parameters provided by the current object position module 202 that does not correspond with the expected relative positional parameters provided by the expected object position module 206.

In some implementations, the sensor determination module 212 can detect improper installation utilizing a single object detection sensor 102. In this implementation, the sensor determination module 212 can determine improper installation (i.e., misplacement) of a single object detection sensor when the target is stationary and the relative motion of the vehicle 100 is known. Thus, the sensor determination module 212 can compare the detected positional parameters for single object detection sensor 102 with the expected positional parameters for the single object detection sensor 102 based upon the known parameters (i.e., target object is stationary and relative motion of the vehicle 100).

The sensor diagnostic module 126 also includes an alert module 214 and a vehicle control module 216. The alert module 214 receives input data generated by the object position comparison module 208 and may receive input data from the sensor determination module 212. The alert module 214 generates an alert indicating that an object detection sensor 102 is improperly installed upon receiving input from the object position comparison module 208 indicating that at least one object detection sensor 102 is improperly installed. For instance, the alert module 214 can generate an on-board diagnostic (OBD) alert, such as an OBD II alert that, that can be displayed at the display 124 to indicate to the on-board diagnostic system that an object detection sensor 102 has been improperly installed. Additionally, the alert module 214 can provide the determined location of the object detection sensor 102 as determined by the sensor determination module 212. In implementations, the alert module 214 can generate a digital trouble code (i.e., DTC).

The vehicle control module 216 generates a control signal that modify an operational state of the vehicle 100. In one example, the vehicle control module 216 generates a vehicle control signal that causes the braking system 112 to engage the braking components of the vehicle 100. In another example, the vehicle control module 216 generates a vehicle control signal that causes the steering system 110 to engage the steering components of the vehicle 100 to cause the vehicle to transition from a first trajectory to a second trajectory. In another example, the vehicle control module 216 generates a vehicle control signal that causes the engine system 116 to engage the engine components to prevent the vehicle from transitioning from a non-moving state to a moving state until the improperly installed object detection sensor 102 is installed properly.

Figure 6:
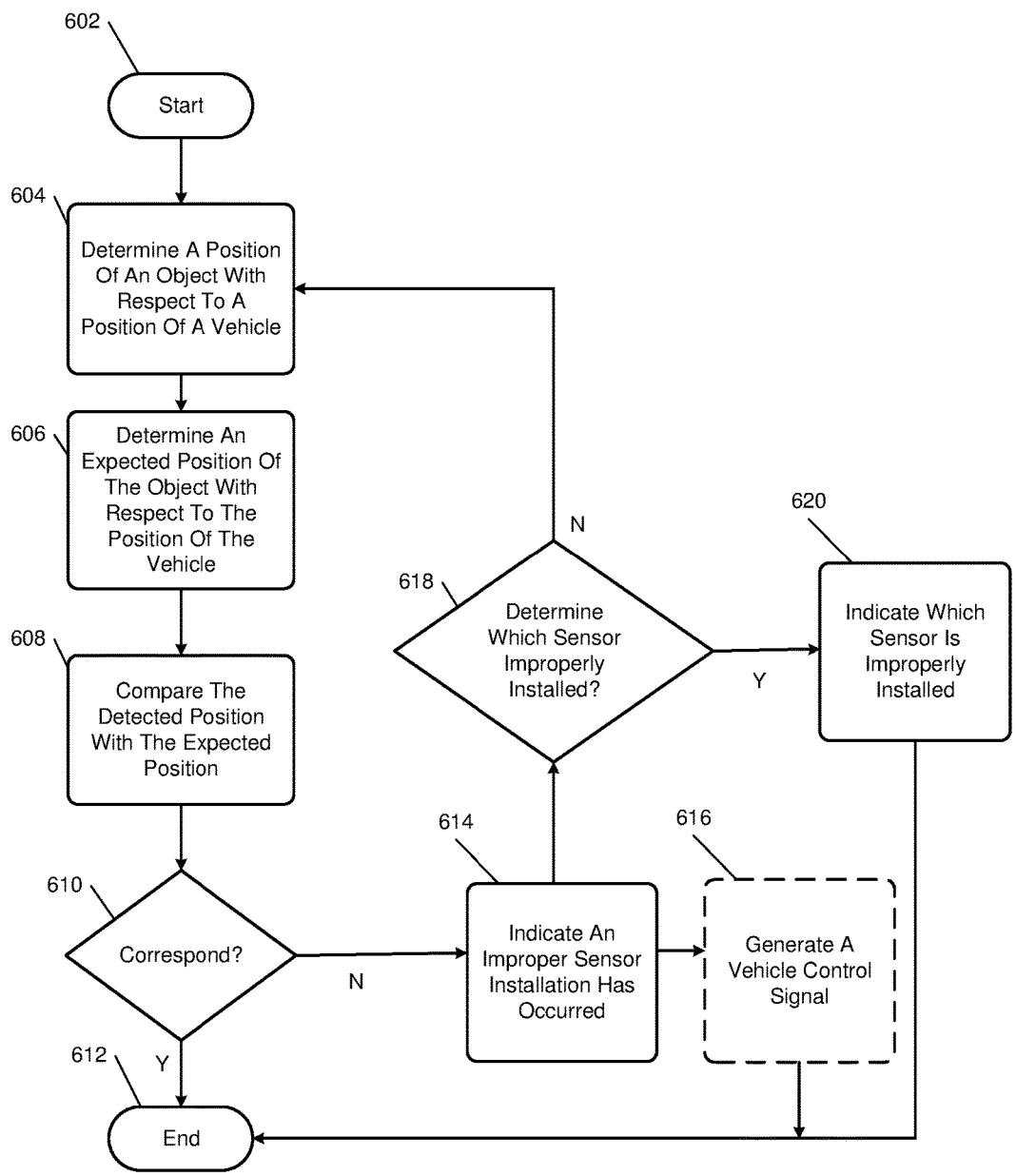
FIG. 6 is a flowchart illustrating an example method for determining whether an object detection sensor is improperly installed according to the principles of the present disclosure.

Referring now to FIG. 6, a method of determining whether an object detection sensor 102 is improperly installed within a vehicle begins at 602. The method is described in the context of the modules included in the example implementation of the sensor diagnostic module 126 shown in FIGS. 1 and 2 in order to further describe the functions performed by those modules. However, the particular modules that perform the steps of the method may be different than the description below and/or the method may be implemented apart from the modules of FIGS. 1 and 2. For example, the method may be implemented by a single module.

The sensor diagnostic module 126 may begin executing the method at 602 when one or more object detection sensors 102 detect an object within a field of view of the respective object detection sensors 102. At 604, the current object position module 202 determines a position of an object with respect to a position of the vehicle. For instance, the respective object detection sensors 102 generate and transmit a signal(s) and measure the time it took for the signal to travel to the object and back to the object detection sensor 102. The current object position module 202 can determine at least a first position of the object with respect to a position of the vehicle 100 detected by a first object detection sensor 102 and can determine at least a second position of the object with respect to a position of the vehicle 100 detected by a second object detection sensor. In one example, first positional parameters (i.e., relative X- and Y-coordinates with respect to the vehicle 100) represent the first position, and second positional parameters (i.e., relative X- and Y-coordinates with respect to the vehicle 100) represent the second position.

At 606, the expected object position module 206 determines an expected position of the object with respect to the position of the vehicle 100. In one example, the expected object position module 206 determines expected positional parameters, such as expected changes in the relative X- and Y-coordinates with respect to the vehicle 100, based upon the detection of an object within overlapping detection regions 402 as determined by the current object position module 202 and the expected relative position and/or angle information of the respective object detection sensors 102. The expected object position module 206 can generate an expected object position table that represents expected detected object behavior.

At 608, the object position comparison module 208 compares the detected position of the object with the expected position of the object. In one example, the object position comparison module 208 compares the detected positional parameters of the object after the object transitions from a first detection region 402(1) associated with a first object detection sensor 102 (i.e., object detection sensor 102(1)) to a second detection region 402(2) associated with a second object detection sensor 102 (i.e., object detection sensor 102(3)) with the expected position of the object.

At 610, the object position comparison module 208 determines whether the detected position of the object corresponds to the expected position of the object. In one example, the object position comparison module 208 determines the expected positional X- and Y-coordinates match the detected positional X- and Y-coordinates of the object. If the object position comparison module 208 determines that the detected position of the object corresponds to the expected position of the object, the sensor diagnostic module 126 ceases execution of the method at 612.

If the object position comparison module 208 determines that the detected position of the object does not correspond to (i.e., deviates from) the expected position of the object, the method transitions to 614. At 614, the alert module 214 receives input indicating an improper installation has occurred and generates an alert signal to alert an operator of the improper installation. In one example, the alert signal can represent an on-board diagnostic (OBD) signal indicating that an object detection sensor 102 has been improperly installed. In another example, the alert signal can represent a digital trouble code (DTC) indicating that an object detection sensor 102 has been improperly installed. The display 124 can receive the alert signal and display information pertaining to the improper installation.

At 616, the vehicle control module 216 can receive a signal from the object position comparison module 208 indicative of the non-corresponding detected position and expected position and generates a vehicle control signal to modify at least one operational state of the vehicle when the vehicle 100 is in an operational state. In one example, the vehicle control module 216 generates a vehicle control signal that causes the braking system 112 to engage the braking components of the vehicle 100. In another example, the vehicle control module 216 generates a vehicle control signal that causes the steering system 110 to engage the steering components of the vehicle 100 to cause the vehicle to transition from a first trajectory to a second trajectory. In another example, the vehicle control module 216 generates a vehicle control signal that causes the engine system 116 to engage the engine components to prevent the vehicle from transitioning from a non-moving state to a moving state until the improperly installed object detection sensor 102 is installed properly.

At 618, the sensor determination module 212 determines whether the sensor determination module 212 can identify which object detection sensor 102 has been improperly installed. If the sensor determination module 212 cannot determine which object detection sensor 102 has been improperly installed, the method continues back to 604 to identify one or more additional objects. If the sensor determination module 212 can determine which object detection sensor has been improperly installed, the sensor determination module 212 provides a signal to the alert module 214 causing the alert module 214 to generate an alert signal indicative of which object detection sensor 102 has been determined to be improperly installed at 620.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCamI, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a current object position module configured to determine a first position of an object with respect to a position of a vehicle based upon sensor data generated by at least a first object detection sensor of a plurality of object detection sensors disposed within the vehicle and determines a second position of the object with respect to the position of the vehicle based upon sensor data generated by a second object detection sensor of the plurality of object detection sensors;
an expected object position module configured to determine an expected position of the object with respect to the position of the vehicle based upon the first position of the object and sensed data corresponding to overlapping detection regions;
an object detection orientation database configured to maintain expected orientation parameters representing an expected angular deviation of the second object detection sensor with respect to the first object detection sensor, wherein the expected object position module is configured to determine the expected position of the object with respect to the position of the vehicle based upon at least the first position of the object and the expected angular deviation; and
an object position comparison module configured to determine that at least one object detection sensor of the plurality of object detection sensors is improperly installed within the vehicle when a comparison of at least the second position of the object with the expected position of the object indicates that the second position deviates from the expected position,
wherein the first position comprises a first X-coordinate and a first Y-coordinate indicative of a relative position of the object detected by the first object detection sensor and the second position comprises a second X-coordinate and a second Y-coordinate indicative of a relative position of the object detected by the second object detection sensor and the expected position comprises a first expected relative change between the second X-coordinate and the first X-coordinate and a second expected relative change between the second Y-coordinate and the first Y-coordinate.

2. The system as recited in claim 1 wherein respective sensors of the plurality of object detection sensors comprises at least one of short-range radars, medium-range radars, long-range radars, image capture devices, light detection and ranging devices, and ultrasound devices.

3. The system as recited in claim 1 further comprising:
an alert module configured to generate an alert when the object position comparison module determines that at least one object detection sensor of the plurality of object detection sensors is improperly installed.

4. The system as recited in claim 3 wherein the alert comprises at least one of an on-board diagnostic alert and a digital trouble code.

5. The system as recited in claim 1 further comprising a vehicle control module configured to generate a vehicle control signal to modify at least one operational state of the vehicle when the object position comparison module determines that at least one object detection sensor of the plurality of object detection sensors is improperly installed.

6. The system as recited in claim 1 wherein the expected object position module is further configured to generate an expected object position table that defines the expected position of the object with respect to the position of the vehicle.

7. The system as recited in claim 6 wherein the expected object position table is generated based upon an orientation parameter of the first object detection sensor.

8. A method comprising:
determining a first position of an object with respect to a position of a vehicle based upon sensor data generated by a first object detection sensor of a plurality of object detection sensors disposed within the vehicle and determines a second position of the object with respect to the position of the vehicle based upon sensor data generated by a second object detection sensor of the plurality of object detection sensors;
determining an expected position of the object with respect to the position of the vehicle based upon at least the first position of the object;
determining whether at least one object detection sensor of the plurality of object detection sensors is improperly installed within the vehicle based upon comparing at least the second position of the object with the expected position of the object,
wherein the first position comprises a first X-coordinate and a first Y-coordinate indicative of a relative position of the object detected by the first object detection sensor and the second position comprises a second X-coordinate and a second Y-coordinate indicative of a relative position of the object detected by the second object detection sensor and the expected position comprises a first expected relative change between the second X-coordinate and the first X-coordinate and a second expected relative change between the second Y-coordinate and the first Y-coordinate; and
determining that at least one object detection sensor of the plurality of object detection sensors is improperly installed within the vehicle when at least one of (1) the first expected relative change does not correspond to a first actual change comprising a difference between the second X-coordinate and the first X-coordinate and (2) the second expected relative change does not correspond to a second actual change comprising a difference between the second Y-coordinate and the first Y-coordinate.

9. The method as recited in claim 8 wherein respective sensors of the plurality of object detection sensors comprises at least one of short-range radars, medium-range radars, long-range radars, image capture devices, light detection and ranging devices, and ultrasound devices.

10. The method as recited in claim 8 further comprising:
generating an alert upon determining that at least one object detection sensor of the plurality of object detection sensors is improperly installed.

11. The method as recited in claim 10 wherein the alert comprises at least one of an on-board diagnostic alert and a digital trouble code.

12. The method as recited in claim 10 further comprising generating a control signal to modify at least one operational state of the vehicle upon determination that at least one object detection sensor of the plurality of object detection sensors is improperly installed.

13. The method as recited in claim 8 further comprising generating an expected object position table that defines the expected position of the object with respect to the position of the vehicle.

14. The method as recited in claim 13 wherein generating the expected object position table further comprises generating the expected object position table based upon an orientation parameter of the first object detection sensor.

15. The method as recited in claim 14 wherein determine the expected position of the object further comprises generating the expected position of the object with respect to the position of the vehicle based upon at least the first position of the object and an expected angular deviation of the second object detection sensor with respect to the first object detection sensor.

* * * * *